Nov. 19, 1935.  J. A. V. TURCK  2,021,393
CALCULATING MACHINE
Original Filed May 22, 1929  5 Sheets-Sheet 1

Inventor:
Joseph A. V. Turck
John C. Carpenter
Atty.

Nov. 19, 1935.  J. A. V. TURCK  2,021,393
CALCULATING MACHINE
Original Filed May 22, 1929   5 Sheets-Sheet 2
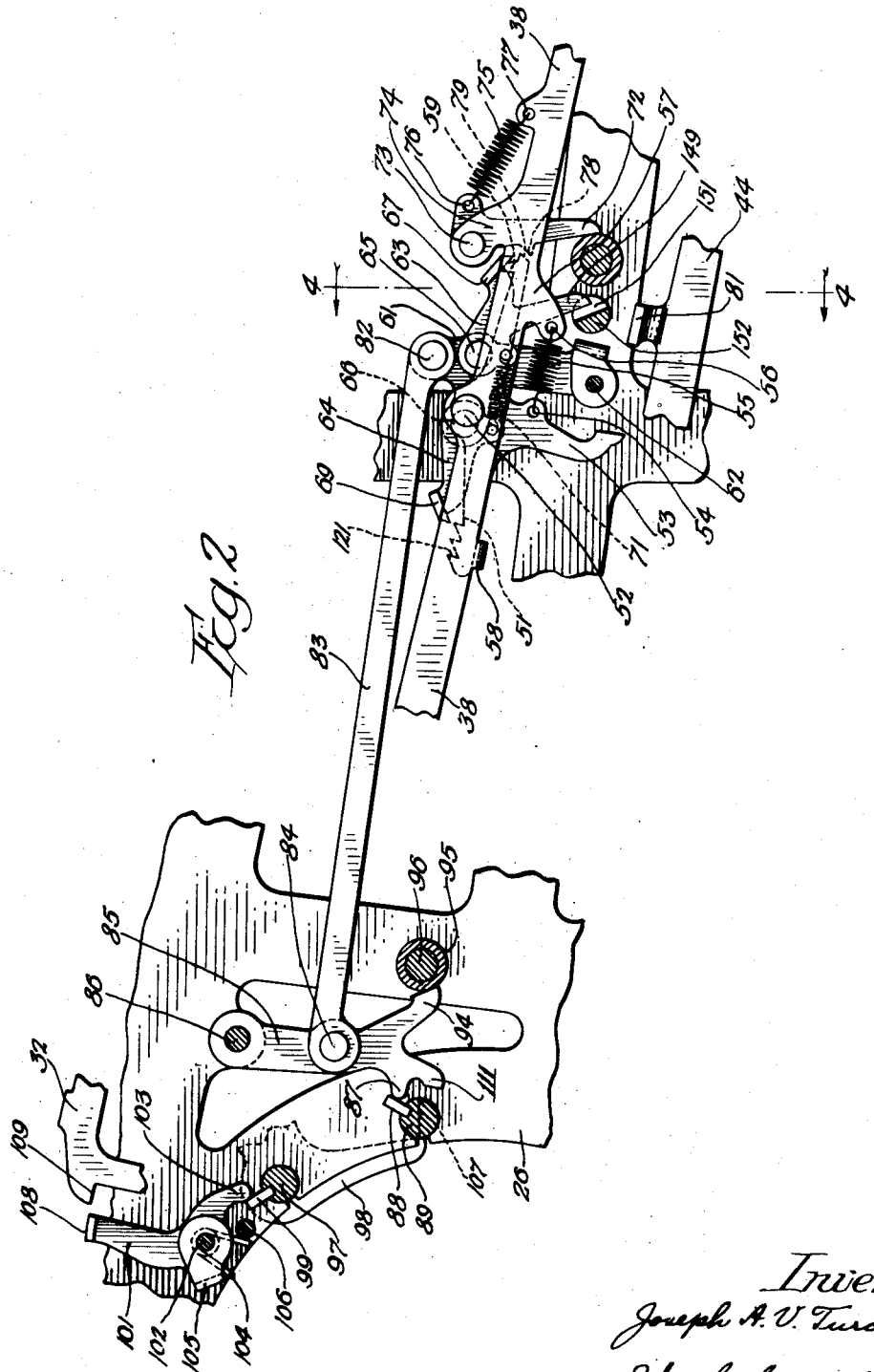
Inventor:
Joseph A. V. Turck
John C. Carpenter
Atty.

Nov. 19, 1935.    J. A. V. TURCK    2,021,393
CALCULATING MACHINE
Original Filed May 22, 1929    5 Sheets-Sheet 3
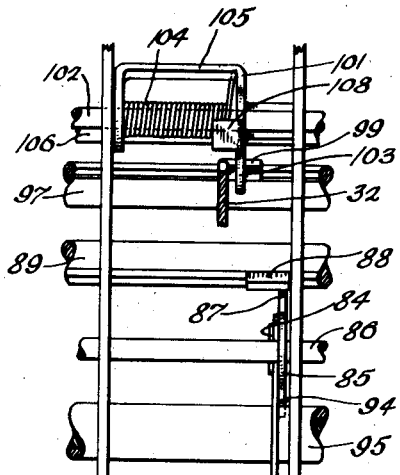
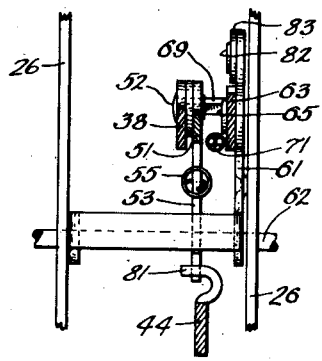
Fig. 4
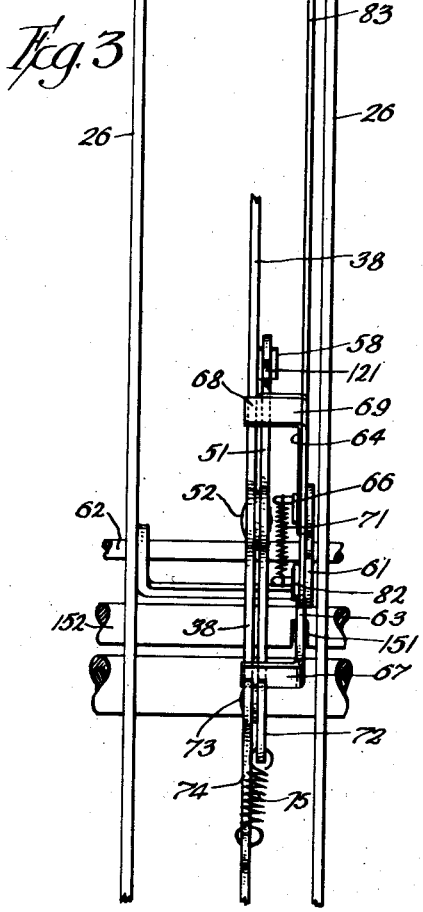
Fig. 3
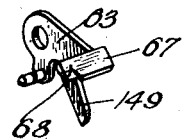
Fig. 5
Inventor:
Joseph A. V. Turck
John C. Carpenter
Atty.

Nov. 19, 1935. J. A. V. TURCK 2,021,393
CALCULATING MACHINE
Original Filed May 22, 1929 5 Sheets-Sheet 5

Inventor:
Joseph A. V. Turck
John C. Carpenter
Atty:-

Patented Nov. 19, 1935

2,021,393

UNITED STATES PATENT OFFICE 2,021,393

CALCULATING MACHINE

Joseph A. V. Turck, Wilmette, Ill., assignor to Felt & Tarrant Manufacturing Company, Chicago, Ill., a corporation of Illinois Application May 22, 1929, Serial No. 364,973
Renewed March 15, 1935

43 Claims. (Cl. 235—130)

This invention relates in general to improvements in calculating machines and has more particular reference to improvements in calculating machines of the power operated, key-responsive type; i. e. the type of calculating machines wherein power mechanism, such as an electric motor, is provided to automatically accomplish adding movement or accumulation in response to key depression and in digital amount determined by the particular key depressed.

The object of the invention broadly stated is to insure against error through mismanipulation of the keys of the keyboard of the calculating machine, as for example, when a key is insufficiently depressed and for example, also, as when re-depression of a key is undertaken before completion of the previous adding stroke.

A principal object of the invention is the provision against miscalculation resulting from insufficient depression of an ordinal key in a key-responsive, power actuated calculating machine.

Another important object of the invention is the provision against miscalculation resulting from key manipulation without permitting full key stroke and full resultant accumulation in a key-responsive, power actuated calculating machine.

Another important object of the invention is the accomplishment of the above-recited objects by mechanism which will, as a result of its action, advise the operator of mismanipulation and permit of correction without the necessity of clearing or zeroizing the calculating machine and repeating previous accurately accomplished calculation.

Another important object of the invention is the provision of connections between the error controlling and determining devices and a zeroizing or cancelling mechanism (which zeroizing or cancelling mechanism is or may be also power actuated and key-responsive) for insuring the establishment of normal conditions throughout the entire calculating machine at each zeroizing or cancelling operation.

Numerous other objects and advantages of the invention will be apparent as it is better understood from the following description, which, when taken in connection with the accompanying drawings, discloses a preferred embodiment thereof.

Referring to the drawings,

Fig. 2 is an enlarged fragmentary elevation of the error controlling devices embodied in the machine and shown in Figure 1;

Fig. 3 is a fragmentary plan view of the parts shown in Fig. 2;

Fig. 4 is a partial section taken substantially on the line 4—4 of Fig. 2;

Fig. 5 is a perspective view of one of the latching dogs of the error control mechanism;

Figure 7:
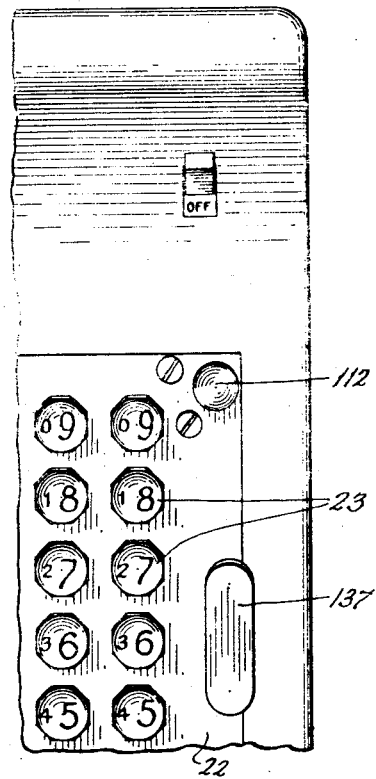
Fig. 7 is a fragmentary plan view of the calculating machine selected for the purpose of illustrating my present invention and disclosing particularly the arrangement of the zeroizing and error control release key.
Figure 8:
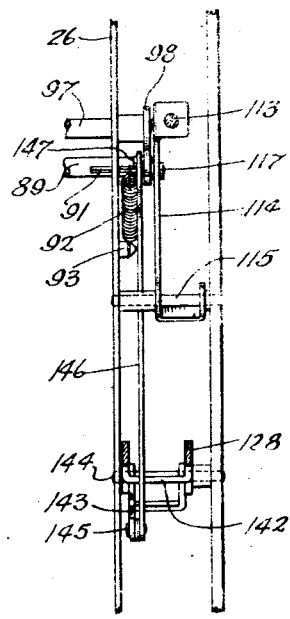
Fig. 8 is a fragmentary top plan view of a part of the zeroizing control mechanism, parts being shown in section.
Figure 9:
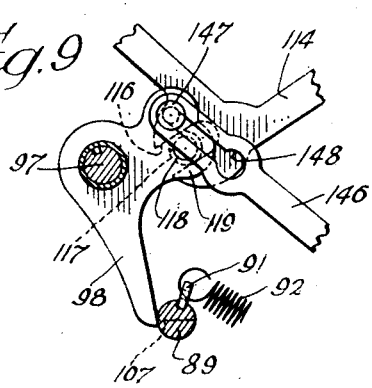
Fig. 9 is an enlarged detail sectional view of certain of the release and zeroizing parts.
Figure 10:
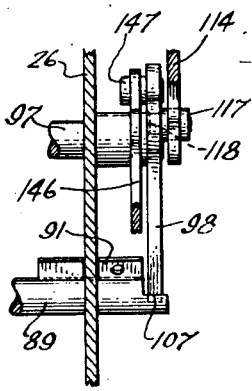
Fig. 10 is an end view of the same.

The key-responsive, power actuated calculating machine shown on the drawings and in which my present invention is preferably embodied, comprises an outer casing generally indicated by reference character 21 and having a keyboard 22 in its upper portion. A plurality of keys 23 are arranged through the keyboard 22 and are adapted for manipulation to determine the digital degrees of the adding or calculating movements of the machine. These keys are arranged to provide a multiple series of orders, as may be observed from Fig. 7.

Each order of keys is adapted to control the digital actuation of a set of accumulator or adding mechanism, the details of which are not shown on the drawings since these details are not believed necessary to an understanding of the present invention. It may, however, be mentioned that each set of accumulator mechanism or division of the adding mechanism includes a pinion 24 mounted upon a cross rod or shaft 25, this shaft extending through partition plates 26 arranged between the various organizations of parts associated with each order of the machine.

Upon depression of a key power is supplied from a power shaft 27 to extend a spring 28 associated with the particular order of mechanism with which the key depressed is identified, release of this spring thereafter accomplishing adding movement in amount determined by the particular key of the order. Upon depression of said key a rack segment 29 is arranged in position to impart proper and accurate digital accumulation in the adding mechanism. In the calculating machine shown on the drawings depression of a key causes its shank 31 to engage a bar 32, which is pivoted at the front at 33 and at the rear at 34 to levers 35 and 36, which levers are pivoted in turn upon crossshafts or rods 37.

A link 38 is connected at 39 to lever 35 and at 41 to lever 36. The bar 32, levers 35 and 36 and link 38 are constructed and mounted as in United States Letters Patent No. 1,371,953 granted to my assignee, Felt & Tarrant Manufacturing Company, of Chicago, Illinois, a corporation of Illinois, on March 15, 1921. Further and more particular description of these parts is therefore thought unnecessary.

The rack sector 29 is pivoted upon a cross shaft 42 and is respectively connected to a hook 43 by a link 44 and a movement controlling bar 45 by a link 46, the former said connection being through a clutch 47. The operation of the parts is such that upon depression of a key, which, as has been explained, engages and depresses bar 32, bar 45 moves forward varying amounts, the particular amount in a particular instance being determined by the digital value of the key depressed. Thereafter and through suitable control mechanisms which, it is thought, need not be here described in detail, the hook 43 is moved down into engagement with a toothed wheel 48 fast on power shaft 27. This engagement pulls the link 44 toward the left, viewing Fig. 1, a set or uniform distance and until the hook is disengaged from the toothed wheel automatically. All of the foregoing is shown and described in my co-pending application, Serial No. 364,974, filed in the United States Patent Office on May 22, 1929, for improvements in Key-responsive calculating machine.

The link 44 extends the spring 28 and moves the rack sector 29 downwardly on an idle stroke and into position to impart an adding movement upon release of the hook and contraction of the spring 28. The downward movement of the rack segment is under the control of the digital control bar 45 and the rack sector is halted when it has been moved a downward distance, enabling it upon return to impart the degree of digital advancement to the adding mechanism which corresponds to the particular key depressed. The clutch 47 permits the continuation of the movement of the link 44 after movement of the rack sector 29 has stopped and until the end of the power stroke and automatic release of the hook 43. Upon the return stroke (the operative stroke of the rack sector) the clutch 47 permits movement of the parts in reverse direction to the beginning of the adding movement and thereafter accomplishes the adding actuation.

The construction and arrangement of the parts of the calculating machine shown upon the drawings and heretofore discussed, form in and of themselves no part of the present invention and more particular description thereof is therefore not undertaken. It will be apparent, however, that upon depression of a key the digital control bar 45 determines the degree and extent of downward movement of the rack sector 29 and that the bar 32 accomplishes arrangement for connection to the power mechanism.

The present invention has for its object, as has been already explained, insurance against error occasioned by inadequate or improper key manipulation by the operator and particularly against error occurring either from inadequate or insufficient key depression and/or repeated depression of a particular key without permitting said key to return to its normal position after depression. In rapid operation of a calculating machine of the power actuated, key responsive type wherein adding movement is automatically and immediately accomplished by the depression of a key it is of course likely that said key, in a particular instance, will be insufficiently depressed to accomplish the desired and intended accumulation in the adding mechanism. The present invention contemplates immediate notice to the operator of an inadequate key stroke, and undertakes to provide opportunity for correction without requiring that earlier computations be repeated.

The invention contemplates the provision of means for locking all other ordinal series of keys upon inadequate depression of a key of an ordinal series and upon correction of the key stroke in the series in which the error occurred the locking of such series itself.

Figure 1:
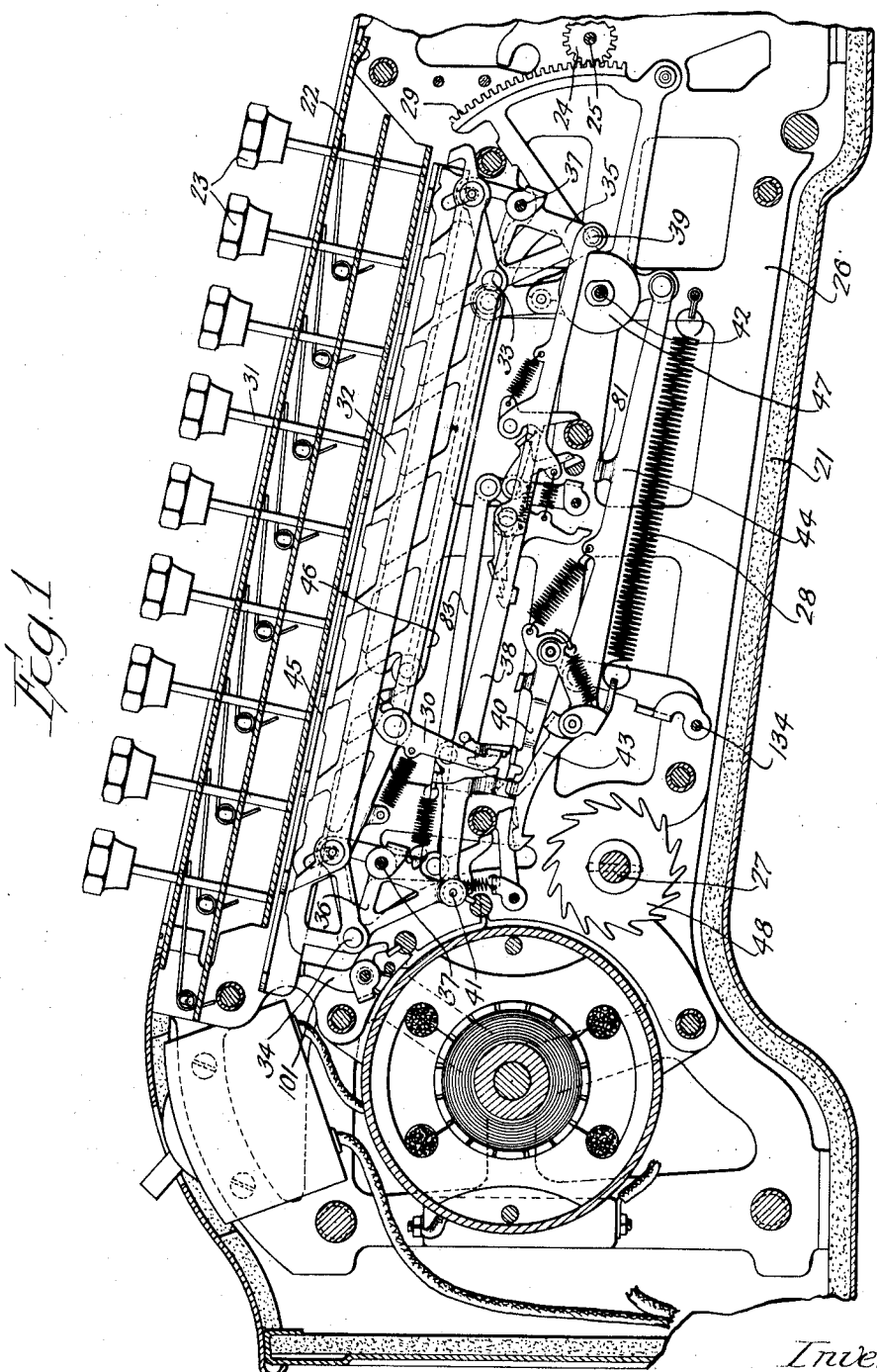
Figure 1 is a vertical front-to-back sectional view taken through a calculating machine in which my present invention is embodied, this view being taken alongside the mechanism associated with any one of the organizations of mechanism associated with an individual order of the machine.

Referring to Fig. 1, the keys 23 are arranged in typical serial order to represent one of the orders of the keyboard of the calculating machine. From the right to the left these keys are numbered from 1 to 9 (in accordance with the usual custom in calculating machines) and the mechanisms are constructed to cause corresponding digital actuation of the adding mechanism in amount determined by the numerical value of any particular key depressed. It will be remembered that upon depression of a key its shank 31 engages and moves downwardly the bar 32. This bar in its movement depresses the levers 35 and 36 and moves as a result of such depression the link 38 to the right. The bar 32 carries a dog 30 which upon depression of the bar 32 by a key moves down upon a spring lifted lever 40 which normally holds the hook 43 in elevated position. Depression of bar 32 therefore permits and accomplishes engagement of the hook with the toothed wheel 48. This toothed wheel is fast on the power shaft and the arrangement of the parts is such that when the hook is engaged with the toothed wheel 48 the downward movement of the rack sector 29 into position to impart the desired digital advance to the accumulator is first accomplished.

Mechanism now about to be described is provided for locking all other ordinal series of keys if a key be depressed insufficiently to insure proper digital operation of the adding mechanism or proper engagement of the connecting means between the power devices and the adding mechanism.

This mechanism comprises a lever 51 pivoted at 52 on link 38. The lever 51 is provided with arms extending oppositely from its pivot 52 and with a downwardly extending arm 53 which is connected at 54 to a spring 55 in turn connected at 56 to a downwardly extending lug 57 on the link 38. The spring 55 normally holds the rearward end of the lever 51 down in engagement with a laterally extending lug 58 formed on the lower edge of the link 38. In this position the forward end of the lever 51 is held in raised position and this end of this lever is provided with an upwardly extending shoulder 59 which, in the normal position, is arranged to extend to or substantially to the upper edge of the link 38. An arm 61 is pivoted upon a cross rod or shaft 62, which extends through the partition plates 26 arranged between the series of ordinal mechanisms.

Two latches or dogs respectively indicated by characters 63 and 64 are pivoted upon the arm 61 at 65 and 66. The dog 63 (which is shown in perspective in Fig. 5) is provided with an operative latch end 67 having a part 68 normally riding upon the upper edge of its adjacent link 38. Dog 64 has a similar latch end 69, having a part also riding upon the upper edge of link 38. The two dogs 63 and 64 are connected by a spring 71 arranged below their pivots and normally tending to draw them downwardly below their pivotal axes.

The upward projection 59 is normally arranged to the left of the latch end 67 of the dog 63 (viewing Fig. 2) and it will be remembered that in the adding movement of the ordinal series of mechanism in which these parts are incorporated the link 38 is moved to the right (viewing this figure). Initial movement in this direction causes the projection 59 to ride under and beyond the latch end 67 and in this initial movement the dog 63 is swung to permit the passing of the projection 59. As soon as the projection 59 of the lever 51 has passed beyond the latch end 67 of the dog 63, the parts automatically arrange themselves under the influence of the spring 71 so that return movement of the link 38 will cause operative engagement between the projection 59 and the latch end 67 to lock all other ordinal series of keys against manipulation unless the lever 51 be moved down and held in a non-engaging position which, as will be presently explained, can only occur after adequate key depression has been accomplished.

If the key stroke has been complete or adequate the forward end of the lever 51, i. e. the end provided with the projection 59, is held down on the return stroke of link 38 by a mechanism which will now be described.

An arm 72 is pivoted at 73 on a lug 74 extending up from the link 38 and this arm 72 is normally pulled toward the left (viewing Fig. 2) by a spring 75 connected at 76 to the arm 72 and at 77 to the link 38. The arm 72 is provided with a shoulder 78 adapted for engagement with a shoulder 79 formed on the forward end of the lever 51. In the forward movement of link 38 the shoulder 79 is arranged above and out of engagement with the shoulder 78 of the arm 72. This relation continues until the parts have advanced sufficiently to insure proper setting of the rack sector 29.

Thereupon mechanism, to be now described, moves the shoulder 79 downwardly and as a result of this downward movement the shoulder 79 is engaged and locked beneath the shoulder 78 of the arm 72. This mechanism comprises a lug 81 upon the link 44 which, as will be observed upon viewing Fig. 1, is positioned to engage the lower end of arm 53 of the lever 51 after relative predetermined travel of the parts. Viewing Fig. 2 it will be noted that engagement of the lug 81 with the lower end of the arm 53 causes the lever 51 to be swung in a clockwise direction and that after engagement of lug 78 above lug or shoulder 79 of lever 51 the lever 51 will be held in a position preventing engagement of the shoulder 59 with the latch extension 67 of the dog 63.

Thus engaged the error controlling mechanisms, just described, are inoperative on the return or adding movement of the rack sector. If, however, the key depression is inadequate to accomplish engagement of the lug 81 with the arm 53 of lever 51 projection 59 is left in position to engage latch end 67 of the dog 63 on the return movement of the parts after key depression.

The arm 61 is pivoted at 82 to a link 83 in turn pivoted at 84 to a lever or arm 85 loosely mounted upon a cross shaft or rod 86 extending through the partition plates 26. The arm or lever 85 is provided with an operative end 87 normally engaging an extension 88 provided in a cross shaft 89 suitably mounted in the partition plates 26 for oscillatory movement, it being understood that each order of adding mechanism is provided with its extension 88 in engagement with its arm or lever 85, the mechanism being individualized to all orders within the capacity of the machine.

The shaft or rod 89 extends across the several ordinal mechanisms of the calculating machine and at one end, i. e. the right hand end, is provided with an extension 91 to which is connected a spring 92 in turn secured at 93 to the partition plates 26 already mentioned. The spring 92 tends to turn the shaft 89 in a clockwise direction (viewing Fig. 2) and against the levers 85 of the several ordinal series of mechanisms, the levers 85 being provided with arms 94 engaging spacers 95 upon a frame tie rod 96 to hold the parts in normal position under the pull of spring 92.

A shaft 97 is arranged through the partition plates 26 and at one end has fixed to it, a lever 98 extending down into engagement with shaft 89 already described. The shaft 97 is provided with an extension 99 at and for each ordinal organization of mechanisms. Referring to Fig. 2 it will be noted that a lever 101 for each order of mechanism is mounted upon a cross shaft or rod 102 extending through partition plates 26. Each lever 101 has an arm 103 engaging its companion extension 99 of shaft or rod 97. A spring 104 is arranged upon rod 102 at each lever 101, one end of this spring engaging a bridge portion 105 of the lever 101 and the other end a stop rod 106 suitably arranged through the partition plates 26. The several springs 104 cause the lever ends 103 to press upon the extensions 99 and urge the shaft 97 in a counter-clockwise direction (viewing Fig. 2) and against shaft 89. The shaft 89 adjacent lever 98 is cut away at one side, as indicated by dotted lines at 107 in Fig. 2, and upon oscillation in a counter-clockwise direction (viewing Fig. 2) the springs 104 permit lever 98 to enter into the cut away part and permit corresponding oscillation of shaft 97.

Shaft 89, as has been explained, is oscillated upon incomplete or inadequate key stroke and as a result levers 101 are moved in a clockwise direction (viewing Fig. 2). Each of these levers is provided with a stop shoulder 108 adapted to be thrown forwardly as the result of oscillation of shaft 89 and corresponding oscillation of shaft 97. Each bar 32 at its rear end is provided with a shoulder 109 normally located just above the forward position of stop shoulder 108.

It will therefore be apparent that upon incomplete or inadequate downward depression of any key of the several ordinal series of keys the shaft 89 will be moved in a counter-clockwise direction (viewing Fig. 2) permitting lever 98 to ride into the cut away portion of said shaft with resulting counter-clockwise movement of shaft 97 and arrangement of stop lugs 108 beneath shoulders 109 of bars 32. The bars 32 are the bars depressed by the keys of the keyboard in actuation of the control of the adding movements of the adding mechanism and obstruction to movement of the bars 32 of course prevents calculating actuation.

This invention contemplates, as one of its features, the locking of the series of keys of the orders of the machine other than that in which the inadequate or insufficient key stroke has occurred and provides opportunity for correction of the key stroke without recomputation of earlier calculations. To this end the key locking mechanism, just described, is without effect upon the series of keys in which the inadequate or insufficient key stroke has occurred. The bar 32 depressed inadequately by a particular key is prevented from engaging above and being held up by its stop lug 108 of lever 101. The lever 85 is provided with a downwardly extending shoulder 111 adapted to engage shaft 89 as a result of engagement of latch extension 67 with projection 59 of its lever 51 upon inadequate key depression. This engagement of extension 111 with shaft 89 prevents elevation of its bar 32 to a degree permitting, stop lug 108 to engage beneath its shoulder 109. The lug 108 engages the end of bar 32 and the lever 101 is held back by the bar until correction.

In the operation of a calculating machine in which my invention is embodied the result of a partial down key stroke, i. e. an inadequate depression of it, is immediately apparent to an operator as he undertakes further computations upon the keyboard. He is immediately advised that a particular stroke has not been completed and since a single order only is unlocked he is advised that his inadequate or insufficient key manipulation in this order has accomplished the locking of the keys of the other orders of the machine. Since the error of necessity has occurred in the last key manipulation in said order, correction may be accomplished by completing the stroke of the key insufficiently depressed. Such depression of the proper key (of a key of its order) permits the bar 32 of such order to be raised into position for engagement by stop lug 108 under its shoulder 109. This engagement results in the locking of the entire keyboard, and release is accomplished by releasing or unlocking mechanism.

A release button 112 is arranged through the keyboard 22 of the casing and this release button is provided with a stem 113 arranged for engagement with a lever 114 pivoted at 115 in the frame of the calculating machine. Lever 114 is provided with a slot 116 in which is arranged a dolly roll 117 upon a stud 118 carried by an arm 119 of lever 98. Upon depression of the key 112 the lever 114 is depressed. Lever 114 swings the arm 98 to the left, viewing Fig. 6, moving it back through the cut-away end of the shaft 89. As soon as the arm 98 has cleared the shaft 89 spring 92 rocks shaft 89 to present the round portion of the shaft end to shaft 89 and the parts are arranged in normal position.

In the embodiment of the invention shown on the drawings means are provided for preventing redepression of a key after a full down stroke and before full adding movement has been accomplished. The arm of the lever 51, which extends rearwardly of the machine and which normally rests upon the laterally extending projection or shoulder 58 of link 38, is provided with a toothed portion 121. This toothed portion 121 is arranged for engagement by the latch extension 69 of dog 64 upon the return or adding movement of link 38. The teeth 121 are of the ratchet order and are adapted to be elevated upon engagement of the projection 78 of the arm 72 with the end 79 of the lever 51. So long as the link 38 moves to the left (viewing Fig. 2) and back to its normal position, the latch extension 69 permits passage of the teeth 121. If, however, effort is made to repeat depression of a key without first permitting full up stroke, latch extension 69 engages teeth 121 of lever 51 and locks the parts until the key is permitted to return to full release position.

Manually manipulative means have already been described for releasing the means and devices provided for locking the keys of the series of multiple orders of adding mechanism of the calculating machine embodying my present invention. The calculating machine shown on the drawings for the purpose of illustrating the present invention is provided with key-responsive power-actuated zeroizing or cancelling mechanism. My invention contemplates, as one of its features, the establishment of fully normal condition of all the parts as a result of the zeroizing, clearing and cancelling of the machine and its accumulators. This includes release of all key locks so that the operator can be certain the machine is free after zeroizing.

Figure 6:
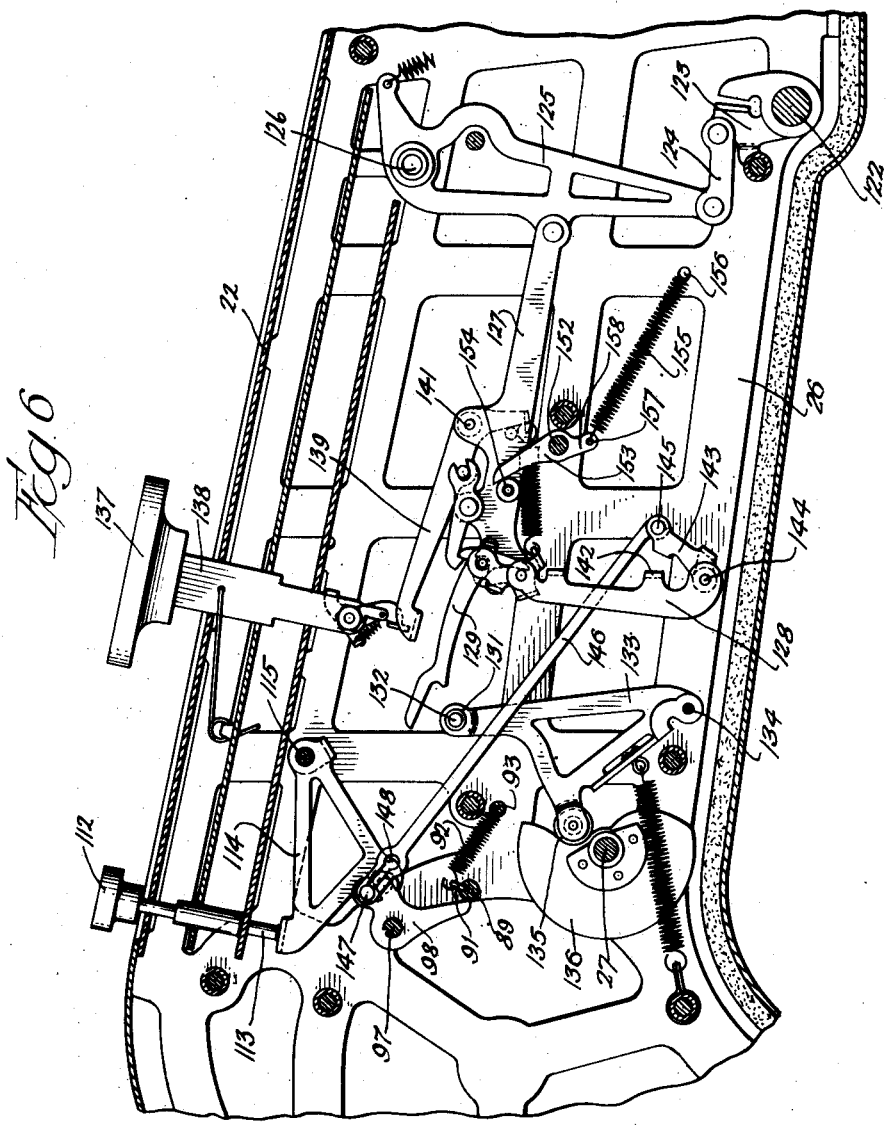
Fig. 6 is a view similar to Fig. 1 and taken at the side of the calculating machine at which the zeroizing or cancelling control is located.

The detailed construction of the gearing forming parts of the accumulator mechanisms forms no part of the present invention and is or may be generally that described and shown in United States Letters Patent No. 1,357,747 granted to Felt & Tarrant Manufacturing Company, assignee of this invention, on November 2, 1920, for Improvements in calculating machines, invented by this inventor, Joseph A. V. Turck. As disclosed in the above mentioned patent, it is contemplated that zeroizing will be accomplished by detrainment of such gearing through the swinging of a frame part under the control of a rock shaft. Referring to Fig. 6 reference character 122 indicates a rock shaft or rocker member, movement of which to the left (viewing Fig. 6) accomplishes the clearing of the registry wheels of the accumulators of the adding mechanism. The zeroizing or cancelling is accomplished by mechanism which includes an arm 123 loosely mounted about shaft 122 and connected by a link 124 to a lever 125 pivoted at 126. The lever 125 is connected by a link 127 to an arm 128, the pivotal connection between the link 127 and the arm 128 providing pivotal support for a hook 129 adapted to engage a stud 132 mounted at 131 on a lever 133 pivoted at 134 in the frame of the machine. The lever 133 is provided with a cam roll 135 adapted for engagement with a cam 136 mounted upon main power shaft 27. A key 137 is arranged through the keyboard of the machine and this key has a shank 138 adapted to depress a lever 139 pivoted at 141 on link 127 to arrange hook 129 in the path of the stud 132 of lever 133 as it is reciprocated by the cam 136.

Upon depression of key 137 lever 139 is depressed and it will be understood that as a result of such depression hook 129 is lowered into the path of movement of the stud 132 of lever 133. Lever 133 is oscillated in accordance with movement of cam 136 and upon engagement with its stud 132 with hook 129, the hook 129, link 127, lever 125, link 124 and arm 123 are all moved toward the right to accomplish cancelling or zeroizing of the accumulators of the adding mechanism.

The arm 128 includes a cross or bridge member 142 and an arm 143 is pivoted concentrically with the arm 128 at 144 and in position to be engaged by said bridge member 142 when the arm 128 is moved to the right (viewing Fig. 6) in a zeroizing or cancelling operation. The arm 143 is connected at 145 to a link 146 which extends up to and is engaged with a headed stud 147 on lever 98, the engagement of this stud with this link being in a slot 148 in the end of link 146. The end of link 146 is slotted instead of merely perforated to facilitate assembly (the lower end of the slot is enlarged so that the stud may be inserted and slipped up into the position shown on the drawings).

Upon depression of key 137 and in response thereto hook 129 is moved down into position for engagement by stud 132 of lever 133 and hook 129 through link 127, both moving toward the right (viewing Fig. 6) accomplish the cancelling or zeroizing operation. This movement is of course accompanied by a clockwise swing of the arm 128, bringing its bridge part 142 into engagement with arm 143. Thereafter arms 128 and 143 move together and through link 146 cause lever 98 to swing back through the cut 107 of the end of shaft 89, thereby unlocking all the keys of the keyboard then held in locked position by projections 108 of levers 101.

The link 146 is preferably given a sufficient length to arrange the arm 143 normally a distance away from the arm 128 so that release of the full stroke locks and devices will be delayed until the lever 133 has had appreciable movement in its zeroizing stroke. It will be remembered that the adding actuation of the numeral wheel is accomplished through the agency of the spring 28 and after the parts have been set by engagement with the hook 43 in the toothed wheel 48. This engagement occurs throughout a minor arc of travel of the shaft 27 and the adding actuation occurs immediately upon disengagement of the hook 43 from the toothed wheel 48. The spacing of the arm 143 normally in advance of the arm 128 insures completion of an adding movement before release of the locks engaged as the result of an inadequate key depression.

Means are also provided for insuring affirmative release of all latch extensions 67 of dogs 63. Each dog 63 is provided with a downwardly extending arm 149 which is normally disposed in an appropriately arranged slot 151 of a cross shaft 152. This shaft has bearing in the partition plates 26 and is provided at its end adjacent or at the zeroizing side of the machine with a lever 153. The lever 153 engages a dolly roll 154 mounted upon link 127 and is held thereagainst by a spring 155 secured at one end at 156 to adjacent partition plate 26 and at its other end at 157 to a tail 158 of lever 153. Shaft 152 is normally arranged so that it exerts no influence upon the dogs 63, the arms 149 of said dogs being loosely arranged in the cut-out portions 151 of said shaft.

Upon a zeroizing operation the link 127 is moved to the right (viewing Fig. 6) swinging the lever 153 in a clockwise direction, such movement rocking shaft 152 to engage and lift the tails 149 of all of the dogs 63 and moving them into position to dispose their latch extensions 67 out of engagement with projections 59 of the levers 51.

Depression of key 137 produces therefore a responsive zeroizing power actuated movement of the parts and releases all of the means, devices and mechanisms provided to compel full stroke of the keys controlling the digital adding or calculating actuations of the machine.

It is thought that the invention and many of its attendant advantages will be understood from the foregoing description and it will be apparent that various changes may be made in the form, construction and arrangement of the parts without departing from the spirit and scope of the invention or sacrificing all of its material advantages.

I claim:

1. In a calculating machine, the combination of multiple order power driven key responsive adding mechanism, keys controlling said adding mechanism, and inter-ordinal devices for locking said keys against subsequent manipulation in the event of a partial key stroke.

2. In a calculating machine, the combination of multiple order power driven key responsive adding mechanism, keys controlling said adding mechanism, inter-ordinal devices for locking said keys against subsequent manipulation in the event of a partial down stroke of a key, and other devices for compelling full return key stroke.

3. In a calculating machine, the combination of power driven adding mechanism divided into digital orders, multiples of ordinal series of keys, devices co-operating with said keys for controlling said orders of adding mechanism, means set in action by said devices for locking said devices against return in the event of a partial down stroke of a key, and devices set in action by the orders of said power driven adding mechanism to release said locking means on a complete key stroke.

4. In a calculating machine, the combination of power driven adding mechanism divided into digital orders, multiples of ordinal series of keys, devices co-operating with said keys for controlling said orders of adding mechanism, means for locking said devices against return in the event of a partial down stroke of a key, devices for compelling full return stroke of the key, and mechanism connected with the individual orders of said adding mechanism for releasing said locking means at the end of a complete key stroke and for throwing into action said devices for compelling full return key stroke.

5. In a calculating machine, the combination of power driven adding mechanism divided into digital orders, multiples of ordinal series of keys, devices co-operating with said keys for controlling said orders of adding mechanism, means for locking said devices in the event of a partial key stroke, and against return movement, and other devices for locking the ordinal series of keys other than that in which such partial key stroke occurs and for locking the keys of said series in which said partial key stroke has occurred upon completion of said partial key stroke.

6. In a calculating machine, the combination of power driven adding mechanism divided into digital orders, multiples of ordinal series of keys, devices co-operating with said keys for controlling said orders of adding mechanism, means for locking said devices in the event of a partial key stroke, and against return movement, other devices for locking the ordinal series of keys other than that in which such partial key stroke occurs and for locking the keys of said series in which said partial key stroke has occurred upon completion of said partial key stroke, and means for insuring full effective key up stroke.

7. In a calculating machine, the combination of power driven adding mechanism divided into digital orders, multiples of ordinal series of keys, devices co-operating with said keys for controlling said orders of adding mechanism, means for locking said devices in the event of a partial key stroke and against return movement, other devices for locking the ordinal series of keys other than that in which such partial key stroke occurs and for locking the keys of said series in which said partial key stroke has occurred upon completion of said partial key stroke, means for insuring full effective key up stroke, and manually operable devices for releasing said locking means and locking devices.

8. In a calculating machine, the combination of power driven adding mechanism divided into digital orders, multiples of ordinal series of keys, devices co-operating with said keys for controlling said orders of adding mechanism, means for locking said devices in the event of a partial key stroke and against return movement, other devices for locking the ordinal series of keys other than that in which such partial key stroke occurs and for locking the keys of said series in which said partial key stroke has occurred upon completion of said partial key stroke, means for insuring full effective key up stroke, and power actuated devices for releasing said locking means and locking devices.

9. In a calculating machine, the combination of power driven adding mechanism divided into digital orders, multiples of ordinal series of keys, devices co-operating with said keys for controlling said orders of adding mechanism, means for locking said devices in the event of a partial key stroke and against return movement, other devices for locking the ordinal series of keys other than that in which such partial key stroke occurs and for locking the keys of said series in which said partial key stroke has occurred upon completion of said partial key stroke, means for insuring full effective key up stroke, and both manually operable and power actuated devices for releasing said locking means and locking devices.

10. In a calculating machine, the combination of power driven adding mechanism divided into digital orders, multiples of ordinal series of keys, devices co-operating with said keys for controlling said orders of adding mechanism, means for locking said devices in the event of a partial key stroke and against return movement, other devices for locking the ordinal series of keys other than that in which such partial key stroke occurs and for locking the keys of said series in which said partial key stroke has occurred upon completion of said partial key stroke, power actuated clearing and zeroizing mechanism for said adding mechanism, and means actuated by said clearing and zeroizing mechanism for releasing said locking means and devices.

11. In a calculating machine, the combination of power driven adding mechanism divided into digital orders, multiples of ordinal series of keys, devices co-operating with said keys for controlling said orders of adding mechanism, means for locking said devices in the event of a partial key stroke and against return movement, other devices for locking the ordinal series of keys other than that in which such partial key stroke occurs and for locking the keys of said series in which said partial key stroke has occurred upon completion of said partial key stroke, power actuated clearing and zeroizing mechanism for said adding mechanism, means actuated by said clearing and zeroizing mechanism for releasing said locking means and devices, and devices for insuring full key up stroke.

12. In a calculating machine, the combination of multiple orders of adding mechanism, power devices for actuating said adding mechanism, keys for controlling the digital values of adding actuation of each said order, and devices locking all other orders of keys in the event of a partial key stroke, and locking the order containing the key receiving the partial stroke upon completion of a key stroke in said order.

13. In a calculating machine, the combination of multiple orders of adding mechanism, power devices for actuating said adding mechanism, keys for controlling the digital values of adding actuation of each said order, and devices locking all other orders of keys in the event of a partial key stroke, and devices connected with said power devices for clearing said locking devices, said connecting devices being inoperative until completion of an adding movement.

14. In a calculating machine, the combination of multiple orders of adding mechanism, power devices for actuating said adding mechanism, keys for controlling the digital values of adding actuation of each said order, devices locking all other orders of keys in the event of a partial key stroke, and locking the order containing the key receiving such partial key stroke upon completion of a key stroke in said order, and devices connected with said power devices for clearing said locking devices, said connecting devices being inoperative until completion of an adding movement.

15. In a calculating machine, the combination of multiple orders of adding mechanism, power devices for actuating said multiple orders of adding mechanism, an ordinal series of keys for each order of adding mechanism and controlling the degree of digital adding actuation thereof, and full stroke compelling devices automatically cleared by said power devices at each full key stroke and upon a partial key stroke locking all orders of keys except the order containing the key receiving said partial key stroke.

16. In a calculating machine, the combination of multiple orders of adding mechanism, power devices for actuating said multiple orders of adding mechanism, an ordinal series of keys for each order of adding mechanism and controlling the degree of digital adding actuation thereof, and full stroke compelling devices automatically cleared by said power devices at each full key stroke and upon a partial key stroke locking all orders of keys except the order containing the key receiving said partial key stroke and locking also said last mentioned order of keys after stroke correction.

17. In a calculating machine, the combination of multiple orders of adding mechanism, power devices for actuating said multiple orders of adding mechanism, an ordinal series of keys for each order of adding mechanism and controlling the degree of digital adding actuation thereof, full stroke compelling devices automatically cleared by said power devices at each full key stroke and upon a partial key stroke locking all orders of keys except the order containing the key receiving said partial key stroke and locking also said last mentioned order of keys after stroke correction, and a manually operable device for releasing the several orders of keys.

18. In a calculating machine, the combination of multiple orders of adding mechanism, power devices for actuating said multiple orders of adding mechanism, an ordinal series of keys for each order of adding mechanism and controlling the degree of digital adding actuation thereof, and full stroke compelling devices automatically cleared by said power devices at each full key stroke and upon a partial key stroke locking all orders of keys except the order containing the key receiving said partial key stroke, and a manually operable device for releasing the said orders of keys after stroke correction.

19. In a calculating machine, the combination of multiple orders of adding mechanism, power devices for actuating said multiple orders of adding mechanism, an ordinal series of keys for each order of adding mechanism and controlling the degree of digital adding actuation thereof, full stroke compelling devices automatically cleared by said power devices at each full key stroke and upon a partial key stroke locking all orders of keys except the order containing the key receiving said partial key stroke, power driven clearing and zeroizing devices for said multiple orders of adding mechanism, and devices connected with said power driven clearing and zeroizing devices for releasing said keys and clearing said full stroke compelling devices.

20. In a calculating machine, the combination of multiple orders of adding mechanism, power devices for actuating said multiple orders of adding mechanism, keys controlling the digital values of adding actuations of said adding mechanism, and inter-ordinal full stroke compelling devices for locking the keys upon mismanipulation to notify the operator of error.

21. In a calculating machine, the combination of multiple orders of adding mechanism, each including accumulator registering devices, power mechanism for actuating said multiple orders of adding mechanism, keys controlling the digital values of said actuations, means locking keys upon mismanipulation, and power operated clearing and zeroizing devices simultaneously clearing or zeroizing said accumulator registering devices and said locking means and restoring all key control mechanism to normal conditions.

22. In a calculating machine, the combination of multiple orders of adding mechanism, each including accumulator registering devices, power mechanism for actuating said multiple orders of adding mechanism, keys controlling the digital values of said actuations, means locking keys upon mismanipulation, power operated clearing and zeroizing devices simultaneously clearing or zeroizing said accumulator registering devices and said locking means and restoring all key control mechanism to normal conditions, and means independent of said power operated clearing and zeroizing devices for permitting correction of such mismanipulation of keys.

23. In a calculating machine, the combination of multiple orders of adding mechanism, each including accumulator registering devices, power mechanism for actuating said multiple orders of adding mechanism, keys controlling the digital values of said actuations, means locking keys upon mismanipulation, power operated clearing and zeroizing devices simultaneously clearing or zeroizing said accumulator registering devices and said locking means and restoring all key control mechanism to normal conditions, and means independent of said clearing and zeroizing devices for releasing said locking means.

24. In a calculating machine, the combination of multiple orders of adding mechanism, each including accumulator registering devices, power mechanism for actuating said multiple orders of adding mechanism, keys controlling the digital values of said actuations, means locking keys upon mismanipulation, power operated clearing and zeroizing devices simultaneously clearing or zeroizing said accumulator registering devices and said locking means and restoring all key control mechanism to normal conditions, and means independent of said cancelling and zeroizing devices for permitting correction of said mismanipulation of keys and the release of said key locking means.

25. In a power-driven key-responsive calculating machine, the combination of power driven adding mechanism divided into digital orders, multiples of ordinal series of keys, devices co-operating with said keys for controlling said orders of adding mechanism, means set in action by said devices for locking said devices against return in the event of a partial down stroke of a key, and devices set in action by the orders of said power driven adding mechanism to release said locking means on a complete key stroke.

26. In a power-driven key-responsive calculating machine, the combination of power driven adding mechanism divided into digital orders, multiples of ordinal series of keys, devices co-operating with said keys for controlling said orders of adding mechanism, means for locking said devices against return in the event of a partial down stroke of a key, devices for compelling full return stroke of the key, and mechanism connected with the individual orders of said adding mechanism for releasing said locking means at the end of a complete key stroke and for throwing into action said devices for compelling full return key stroke.

27. In a power-driven key-responsive calculating machine, the combination of power driven adding mechanism divided into digital orders, multiples of ordinal series of keys, devices co-operating with said keys for controlling said orders of adding mechanism, means for locking said devices in the event of a partial key stroke, and against return movement, and other devices for locking the ordinal series of keys other than that in which such partial key stroke occurs and for locking the keys of said series in which said partial key stroke has occurred upon completion of said partial key stroke.

28. In a power-driven key-responsive calculating machine, the combination of power driven adding mechanism divided into digital orders, multiples of ordinal series of keys, devices co-operating with said keys for controlling said orders of adding mechanism, means for locking said devices in the event of a partial key stroke, and against return movement, other devices for locking the ordinal series of keys other than that in which such partial key stroke occurs and for locking the keys of said series in which said partial key stroke has occurred upon completion of said partial key stroke, and means for insuring full effective key up stroke.

29. In a power-driven key-responsive calculating machine, the combination of multiple orders of adding mechanism, power devices for actuating said adding mechanism, keys for controlling the digital values of adding actuation of each said order, and devices locking all other orders of keys in the event of a partial key stroke, and locking the order containing the key receiving the partial stroke upon completion of a key stroke in said order.

30. In a power-driven key-responsive calculating machine, the combination of multiple orders of adding mechanism, power devices for actuating said adding mechanism, keys for controlling the digital values of adding actuation of each said order, and devices locking all other orders of keys in the event of a partial key stroke, and devices connected with said power devices for clearing said locking devices, said connecting devices being inoperative until completion of an adding movement.

31. In a power-driven key-responsive calculating machine, the combination of multiple orders of adding mechanism, power devices for actuating said multiple orders of adding mechanism, an ordinal series of keys for each order of adding mechanism and controlling the degree of digital adding actuation thereof, and full stroke compelling devices automatically cleared by said power devices at each full key stroke and upon a partial key stroke locking all orders of keys except the order containing the key receiving said partial key stroke.

32. In a power-driven key-responsive calculating machine, the combination of multiple orders of adding mechanism, power devices for actuating said multiple orders of adding mechanism, an ordinal series of keys for each order of adding mechanism and controlling the degree of digital adding actuation thereof, and full stroke compelling devices automatically cleared by said power devices at each full key stroke and upon a partial key stroke locking all orders of keys except the order containing the key receiving said partial key stroke and locking also said last mentioned order of keys after stroke correction.

33. In a power-driven key-responsive calculating machine, the combination of multiple orders of adding mechanism, each including accumulator registering devices, power mechanism for actuating said multiple orders of adding mechanism, keys controlling the digital values of said actuations, means locking keys upon mismanipulation, and power operated clearing and zeroizing devices simultaneously clearing or zeroizing said accumulator registering devices and said locking means and restoring all key control mechanism to normal conditions.

34. In a calculating machine, the combination of power driven adding mechanism divided into digital orders, multiples of ordinal series of keys, devices for co-operating with said keys for controlling said orders of said adding mechanism, and locking means rendered operative upon incomplete depression of a key and locking the ordinal series of keys other than that in which the incomplete depression occurred.

35. In a calculator, the combination of a multiplicity of ordinal adding mechanisms, actuating mechanisms for said adding mechanisms and including a power member a series of keys for each order of said adding mechanisms, the keys of the several series being operable simultaneously and in overlapping, non-synchronous sequence, and devices for locking all of the keys in all of the orders, in case of a partial key stroke, except in the order in which said partial key stroke occurred.

36. In a calculator, the combination of a multiplicity of ordinal adding mechanisms, actuating mechanisms for said adding mechanisms and including a power member a series of keys for each order of said adding mechanisms, the keys of the several series being operable simultaneously and in overlapping, non-synchronous sequence, devices for locking all of the keys in all of the orders, in case of a partial key stroke, except in the order in which said partial key stroke occurred, and devices for compelling a full return of operated keys before redepression.

37. In a calculator, the combination of a multiplicity of ordinal adding mechanisms, actuating mechanisms for said adding mechanisms and including a power member a series of keys for each order of said adding mechanisms, the keys of the several series being operable simultaneously and in overlapping, non-synchronous sequence, devices for locking all of the keys in all of the orders, in case of a partial key stroke, except in the order in which said partial key stroke occurred, and locking the keys in the order in which said partial key stroke occurred after redepression of a key of said order.

38. In a calculator, the combination of a multiplicity of ordinal adding mechanism, actuating mechanisms for said adding mechanisms and including a power member a series of keys for each order of said adding mechanisms, the keys of the several series being operable simultaneously and in overlapping, non-synchronous sequence, devices for locking all of the keys in all of the orders, in case of a partial key stroke, except in the order in which said partial key stroke occurred and locking the keys in the order in which said partial key stroke occurred after redepression of a key of said order, and devices for manually clearing said locking devices.

39. In a calculator, the combination of a multiplicity of ordinal adding mechanisms including registry wheels, actuating mechanisms for said adding mechanisms and including a power member a series of keys for each order of said mechanisms, the keys of the several series being operable simultaneously and in overlapping, non-synchronous sequence, zeroizing mechanism for clearing said registry wheels, devices for locking all of the keys in all of the orders, in case of a partial down stroke in one of said orders, except in the order in which said partial key stroke occurred, and for locking the keys of the last mentioned order after a full stroke of one of its keys, and devices manually operable for releasing said locking devices and connected to said zeroizing mechanism and operable thereby to release said locking devices during the clearing of the register.

40. In a calculating machine, the combination of power driven adding mechanism divided into digital orders, multiples of ordinal series of keys, devices co-operating with said keys for controlling said orders of adding mechanism, means for locking said devices against return in the event of a partial down stroke of a key, devices for compelling full return stroke of the key, and mechanism connected with the individual orders of said adding mechanism for releasing said locking means at the end of a complete key stroke.

41. In a calculating machine, the combination of multiple orders of adding mechanism, power devices for actuating said multiple orders of adding mechanism, an ordinal series of keys for each order of adding mechanism and controlling the degree of digital adding actuation thereof, and full stroke compelling devices automatically cleared by said power devices at each full key stroke.

42. In a power driven calculator, the combination of a multiplicity of ordinal adding mechanisms including registry wheels, actuating mechanisms for said adding mechanisms and including a power member, a series of keys for each order of said mechanisms, the keys of the several series being operable simultaneously and in overlapping, non-synchronous sequence, zeroizing mechanism for clearing said registry wheels, devices for locking all of the keys in all of the orders, in case of a partial down stroke in one of said orders, except in the order in which said partial key stroke occurred, and for locking the keys of the last mentioned order after a full stroke of one of its keys, devices compelling a full return of operated keys before redepression, and devices manually operable for releasing said locking devices and connected to said zeroizing mechanism and operable thereby to release said locking devices during the clearing of the register.

43. In a calculating machine, the combination of power driven adding mechanism divided into digital orders, multiples of ordinal series of keys, devices co-operating with said keys for controlling said orders of adding mechanism, and means compelling a full return of operated keys before redepression.

JOSEPH A. V. TURCK.